United States Patent
Yeturu (10) Patent No.: US 10,074,200 B1
(45) Date of Patent: Sep. 11, 2018

(54) GENERATION OF IMAGERY FROM DESCRIPTIVE TEXT

(71) Applicant: Amazon Technologies, Inc., Seattle, WA (US)

(72) Inventor: Kalidas Yeturu, Thiruvalluvar Salai (IN)

(73) Assignee: Amazon Technologies, Inc., Seattle, WA (US)

(*) Notice: Subject to any disclaimer, the term of this patent is extended or adjusted under 35 U.S.C. 154(b) by 87 days.

(21) Appl. No.: 14/693,608

(22) Filed: Apr. 22, 2015

(51) Int. Cl.
| | | |
|---|---|---|
| *G06F 17/00* | (2006.01) | |
| *G06F 3/048* | (2013.01) | |
| *G06F 17/27* | (2006.01) | |
| *G06T 11/20* | (2006.01) | |
| *G06K 9/18* | (2006.01) | |
| *G06F 17/21* | (2006.01) | |

(52) U.S. Cl.
CPC .............. *G06T 11/20* (2013.01); *G06F 17/21* (2013.01); *G06K 9/18* (2013.01)

(58) Field of Classification Search
CPC .... G06F 17/212; G06F 17/2785; G06T 17/00
See application file for complete search history.

(56) References Cited

U.S. PATENT DOCUMENTS

| 7,016,828 | B1* | 3/2006 | Coyne | G06F 17/212 |
| | | | | 704/9 |
| 8,290,206 | B1* | 10/2012 | Meyers | G06Q 10/101 |
| | | | | 382/100 |
| 2005/0198070 | A1* | 9/2005 | Lowry | G06F 17/30619 |
| 2006/0072137 | A1* | 4/2006 | Nishikawa | G06F 17/214 |
| | | | | 358/1.11 |
| 2008/0162528 | A1* | 7/2008 | Jariwala | G06F 17/241 |
| 2010/0010951 | A1* | 1/2010 | Miyazaki | G06N 5/025 |
| | | | | 706/47 |
| 2012/0192118 | A1* | 7/2012 | Migos | G06F 1/1626 |
| | | | | 715/863 |
| 2015/0339034 | A1* | 11/2015 | Garcia | G06F 3/04842 |
| | | | | 715/738 |

* cited by examiner

Primary Examiner — Sing-Wai Wu
(74) Attorney, Agent, or Firm — Lee & Hayes, PLLC (57) ABSTRACT

Imagery may be generated for a written work based on textual descriptions in the written work using an automated or partially automated process. The imagery may be used to create a trailer for the written work, for insertion into a digital version of the written work, to visually represent the written work, and/or for other reasons. Descriptive text from the written work may be identified and associated with a catalog of imagery, which include image objects that are discrete images of subjects. The image objects may be compiled with other image objects to create an initial image. The initial image may be edited by a user or other person to add more detail, modify subjects, add an additional subject, remove subjects, change attributes, and/or make other changes to the initial image.

20 Claims, 10 Drawing Sheets

GENERATION OF IMAGERY FROM DESCRIPTIVE TEXT

BACKGROUND

Many books and other collections of text include visual representations, such as images or drawings. These visual representations may be used for artistic purposes, to assist a reader in understanding the text, for marketing purposes, and/or for other reasons. For example, a printed book may include visual representations on a dust jacket, at the start of each chapter, and in various other locations in the book. Images may include a map, a drawing of a character and/or scene, and other types of imagery. Often these visual representations are created by an illustrator as a work for hire for the author or publisher. This requires planning, time, and money, which all may be lacking for some authors, such as self-publishing authors.

Electronic-publishing has risen in popularity. Now, almost anyone with access to the Internet is capable of self-publishing a written work in some form. Some services facilitate publishing books or other types of text-based works for specific devices or applications, such as electronic book (eBook) reader devices or eBook reader applications. However, many of these written works lack visual representations. Similarly, most manuscripts or other drafts of written works do not include visual representations.

BRIEF DESCRIPTION OF THE DRAWINGS

The detailed description is described with reference to the accompanying figures. In the figures, the left-most digit(s) of a reference number identifies the figure in which the reference number first appears. The same reference numbers in different figures indicate similar or identical items.

DETAILED DESCRIPTION

This disclosure is directed to generation of imagery for a written work based on textual descriptions in the written work. The imagery may be used to create a trailer for the written work, for insertion into a digital version of the written work, to visually represent the written work, and/or for other reasons. The written work may include a manuscript, a draft, and/or a finished version of a book, a journal, a story, an article, a blog, a news post, or any other type of written work.

In accordance with one or more embodiments, a written work may be analyzed to determine portions that are dense with descriptive text. For example, the written work may be analyzed and scored to determine areas that are dense with descriptive words that can be used to create vivid imagery. In some instances, portions of text may be identified using other techniques, such as user input, crowd sourcing of information, and/or other input techniques to select portions of text to use to create imagery.

The descriptive text may be identified and associated with a catalog of imagery, which include image objects that are discrete images of subjects. The image objects may be combined, assembled, or compiled with other image objects to create an interesting image. For example, the descriptive text may be associated with an image and/or with image-objects, which may include modifiable attributes. An example of descriptive text may include a sentence such as "A green spotted dragon chased the red-haired freckled boy into his basement." A subject of the sentence may include "dragon" and an object of the sentence may include "boy", each having some attributes (e.g., adjectives). Attributes may also include adverbs and/or modifiers. Image objects of a dragon and a boy may be selected based on this descriptive text. Attributes of the dragon may be set to "green" and/or "spotted" while attributes of the boy may be set to "red hair" and/or "freckles." The image may include a scene of an inside of a house, possibly showing an entrance into a basement. The image objects, scenes, and other imagery may be identified for selection based on metadata associated with the images, such as keywords associated with imagery stored in an imagery datastore. Ultimately, selected image objects, a selected scene, and/or other selected imagery may be compiled and/or assembled into an initial image. In some instances, the descriptive words may be used to create an image of a single subject (e.g., an object), such as the dragon or the boy. More complex images may include multiple subjects, and thus may include multiple image objects, backgrounds (i.e., imagery behind image objects that creates backdrop for an image), moods, themes (e.g., crime scene, sci-fi, etc.), visual effects (e.g., painted canvas, line sketch, realistic rendering, etc.), and/or other visual features.

In some embodiments, the initial image may be edited by a user or other person to add more detail, modify subjects, add an additional subject, remove subjects, change attributes, and/or make other changes to the initial image using an editing interface. The editing interface may receive additional text, such as text input by a user, to analyze and add more details to the image. In the example, above, a user may add text such as "The boy's pants are red and his shirt is striped." This descriptive text may then be analyzed similar to the original descriptive text, and may be used to add subjects, modify subjects, specify attribute values, and/or make other changes to the initial image. The initial image may also be updated in other ways, such as using controls or commands associated with a subject. For example, a subject may be a shirt, which may include attributes such as "color", "pattern", "style", and so forth. When a shirt is included in the initial image, the editing interface may include fields to enable user selection of attributes that are not populated by the descriptive text. The attributes may be assigned default values or random values for an initial presentation of the subject.

Multiple different outputs may be generated by the created imagery. In some instances, the created imagery may be inserted into an electronic version of the written work, such as an electronic book (eBook). The created imagery may be used at the start of chapters, for a dust jacket of a book, and/or in other locations of a book or other written work. The created imagery may be used to create promotional content, such as a trailer for a written work (e.g., a series of images that reveal some information about the written work, etc.) and/or images used to market or advertise the written work. In some instances, the created imagery may be used to visually represent portions of a manuscript, which may enable editors to more easily understand aspects about the written work.

The generation of imagery from written works may be implemented in part through use of a classifier. The classifier may be trained using training data, which may include imagery from existing archives of electronic documents that include imagery. The classifier may be updated using machine learning based on selection of images, popularity of images and/or written works with added imagery, modification of images, and/or other inputs or interaction with the initial image. Machine learning may also be used to infer geometric relative placement of components of imagery, possibly before advanced editing using a user interface.

The techniques and systems described herein may be implemented in a number of ways. Example implementations are provided below with reference to the following figures.

Figure 1:
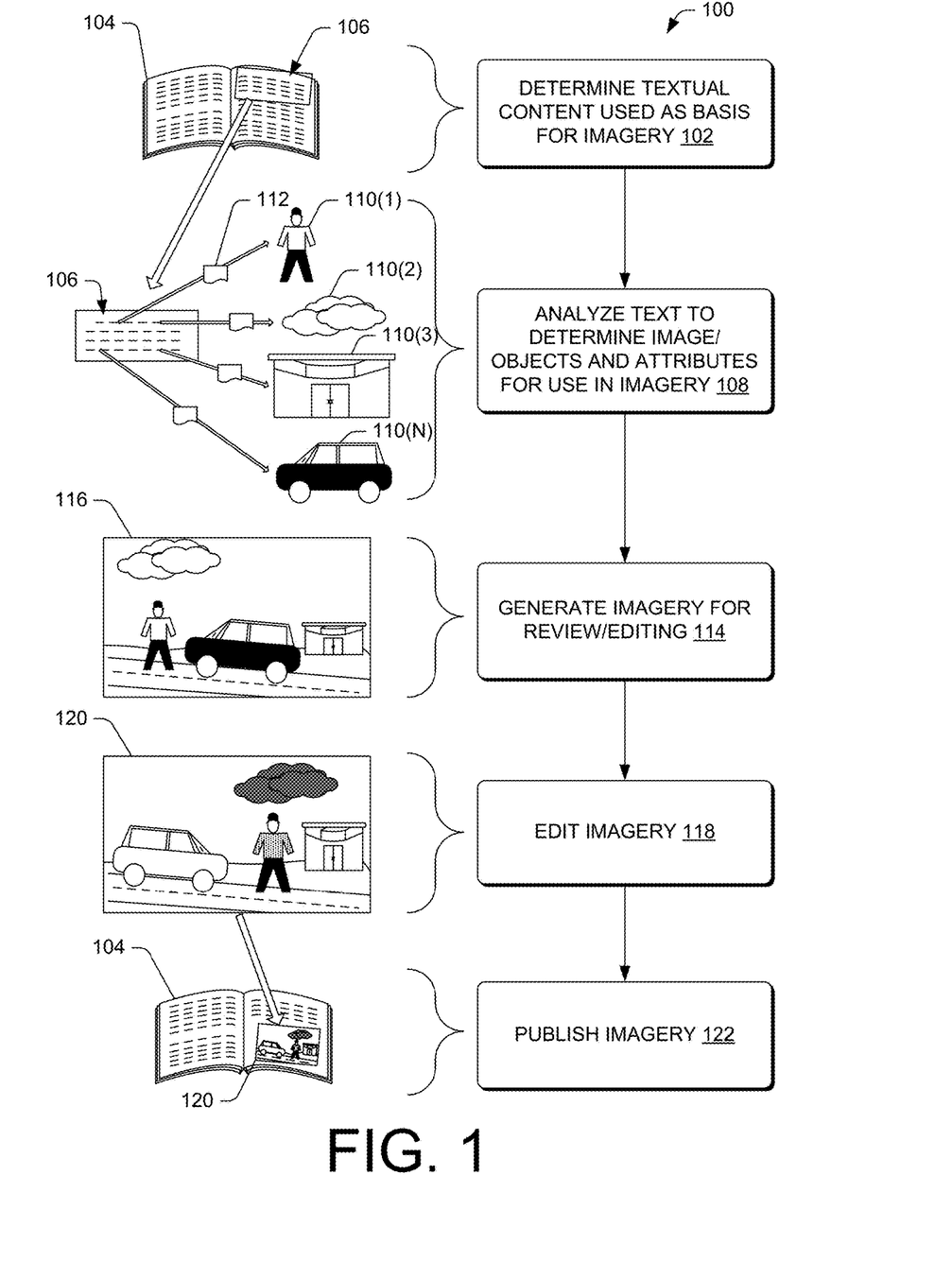
FIG. 1 is a pictorial flow diagram of an illustrative process of generating imagery from descriptive text included in a written work.

FIG. 1 is a pictorial flow diagram of an illustrative process 100 of generating imagery from descriptive text included in a written work. At 102, a written work 104 may be analyzed to identify locations that include descriptive text 106 usable to generate imagery. The descriptive text 106 may include detailed descriptions of subjects, such as a people, places, and/or things. In some embodiments, different words, phrases, or sentences may be scored based on values associated with descriptive aspects of the words, phrases, or sentences. The scores may be used to determine a subject of the descriptive text 106 to use to create imagery. Various portions of text may comprise the descriptive text 106 and be used to create imagery, such as different portions of text throughout the written work 102 that describe a subject, such as a character, place, or thing in the written work. In some instances, the descriptive text may be determined by a user selection, crowd sourcing (e.g., annotating a portion of text, social media about a portion of text, etc.), and/or through other inputs (random selections, based on organization of the text, etc.). In some embodiments, the descriptive text may be determined by crowdsourcing by identifying use of and/or interaction with key words by multiple people such as in other writings, posts, messages, or other communications. Crowdsourcing may include determining text that is annotated, modified, copied, and/or used or manipulated in other ways by readers or other people that interact with the text. Crowdsourcing may provide metadata that is associated with the text or portions of the text, which may be used during a selection process to determine whether or not to select a portion of the text to create an image.

At 108, the descriptive text 106 may be analyzed to determine image(s) and/or image object(s) (i.e., components assembled to create an image) to associate with the descriptive text. In a simple case, the descriptive text 106 may be used to select an existing complete image that is closely associated with the descriptive text. This may be accomplished by matching the descriptive text with metadata associated with an image. In some embodiments, the descriptive text 106 may be used to identify multiple image objects 110. The image objects 110 may include subjects including a person 110(1), scene information 110(2), a place 110(3), and/or a thing 110(N). The image objects 110 may include attributes 112, which may be used to modify aspects of the subject. For example, attributes of the person 110(1) may include a color, pattern, and type of shirt worn by the person. An image object may include many predetermined attributes. The attributes may be associated with the image object, and assigned values (e.g., colors, shapes, types, etc.) based on the descriptive text and/or other information (e.g., default values, random assignments, null values, etc.).

At 114, an initial image 116 may be generated by compiling the image object 110 and arranging the image objects based at least in part on the descriptive text, when possible. For example, when the descriptive text 106 includes a location of a person relative to a thing, then the initial image 116 show that relationship after the generation of the initial image 116. As discussed above, some information may not be available to completely determine attributes of image objects, locations of image objects, and/or other characteristics of the image. In such situations, attribute values may be assigned with our without user input. Further, locations for the image objects may be assigned with or without user input. In some embodiments, the initial image 116 may be generated with no user input. However, as explained below, user input may be received and used to edit or otherwise modify the initial image to create a modified image. In some embodiments, multiple images maybe created for a portion of descriptive text, which may then allow user selection to select a best match, for example.

At 118, the initial image 116 may be modified or edited to create a completed image 120. Modifications and edits may include adding image objects, removing image objects, assigning attribute values, specifying visual effects, and/or otherwise modifying or editing the image. In some embodiments, additional text may be inputted, and analyzed as discussed above, to modify the image. In this way, a user may input natural language text (e.g., by typing, speaking, etc.), which may be analyzed and used to modify or edit the image. Conventional editing techniques may also be used, such as select/move operations, entry fields, and/or other inputs, which are shown and described below with reference to FIG. 8. As an example, the initial image 116 may be modified to specify a location of a car, a pattern of a shirt, and a color of a cloud.

At 122, the completed image may be published. Publication may include insertion of the image in the written work, use of the image as promotional content associated with the written work, and/or other uses. For example, an eBook or manuscript that does not contain images may be processed using the process 100 to add images to the written work. A collection of images generated for the written work 104 may be used as a trailer for the written work in some instances. Other uses are also possible. Multiple images may be generated by repeating some or all of the process 100.

Figure 2:
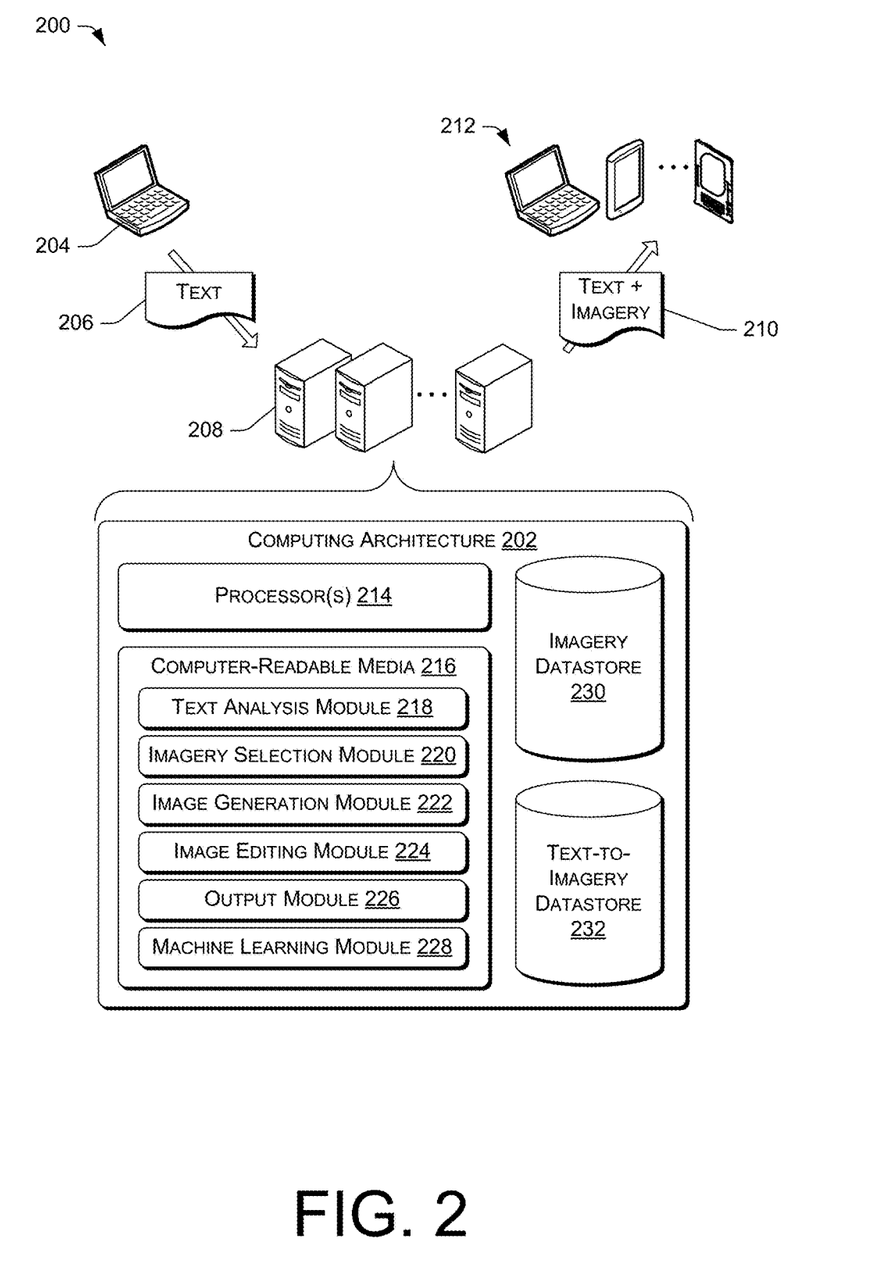
FIG. 2 is a schematic diagram of an illustrative computing environment including illustrative computing architecture to generate imagery from descriptive text included in a written work.

FIG. 2 is a schematic diagram of an illustrative computing environment 200 including illustrative computing architecture 202 to generate imagery from descriptive text included in a written work. The computing environment 200 may include a user device 204 that creates a written work having text 206. The text 206 may be transmitted to a computing device 208 having the computing architecture 202, which may generate imagery based at least in part on the text 206.

The computing device 208 may generate imagery for the text, which may be combined in part with the text to create text/imagery 210. The text/imagery 210 may be transmitted to an end-user device 212, such as a device associated with a consumer. However, other distributions, devices, and exchanges of data may be performed.

The computing architecture 202 may include one or more processors 214 and one or more computer readable media 216 that stores various modules, applications, programs, or other data. The computer-readable media 216 may include instructions that, when executed by the one or more processors 214, cause the processors to perform the operations described herein.

Embodiments may be provided as a computer program product including a non-transitory machine-readable storage medium having stored thereon instructions (in compressed or uncompressed form) that may be used to program a computer (or other electronic device) to perform processes or methods described herein. The machine-readable storage medium may include, but is not limited to, hard drives, floppy diskettes, optical disks, CD-ROMs, DVDs, read-only memories (ROMs), random access memories (RAMs), EPROMs, EEPROMs, flash memory, magnetic or optical cards, solid-state memory devices, or other types of media/machine-readable medium suitable for storing electronic instructions. Further, embodiments may also be provided as a computer program product including a transitory machine-readable signal (in compressed or uncompressed form). Examples of machine-readable signals, whether modulated using a carrier or not, include, but are not limited to, signals that a computer system or machine hosting or running a computer program can be configured to access, including signals downloaded through the Internet or other networks. For example, distribution of software may be by an Internet download.

In some embodiments, the computer-readable media 216 may store a text analysis module 218, an imagery selection module 220, an image generation module 222, an image editing module 224, an output module 226, and a machine learning module 228, which are described in turn. The components may be stored together or in a distributed arrangement. The computing architecture 202 may also include an imagery datastore 230 and a text-to-imagery datastore 232. The imagery datastore 230 may include metadata for imagery. The metadata may be used with the text-to-imagery datastore 232 to associate imagery with descriptive language. In some embodiments, the metadata may be used to create the text-to-imagery datastore 232.

The text analysis module 218 may determine a portion of a written work to use to create an image. Within this portion, the text analysis module 218 may determine descriptive text (e.g., the descriptive text 106 shown in FIG. 1) used to associate with imagery (e.g., an image, image objects, etc.) and attributes of the imagery. The text analysis module 218 may determine the portion of the work by scoring words, combinations of words, sentences, paragraphs, and/or other parts of a written work. The scores may be representative of an amount of description. For example, nouns, verbs, adjectives, and other parts of speech may have different scores of ranges of scores. Scores may be associated with specific words, such as words included in metadata associated with imagery in the imagery datastore 230 and/or in the words included in the text-to-imagery datastore 232. Sections of the written work with a relatively high score (e.g., paragraphs, pages, etc.) may be designated as being dense in descriptive text. In some instances, the descriptive text may be determined based on user input, by crowdsourcing information, and/or using other techniques (e.g., grouping different intervals of text, random selection, etc.). For example, crowdsourcing may include selecting text that includes a threshold number of annotations, text indicated as being popularly or frequently used, quoted text, and so forth.

The text analysis module 218 may select specific words as descriptive text, which may then be used to select imagery, such as image objects for inclusion in an initial image created based on the descriptive text. The text analysis module may parse natural language sentences to identify descriptive words, meanings of descriptive words in the context of the written work, and/or important of words (e.g., based on reoccurrence, etc.), and/or other information. A toolkit may generate a parse tree listing out subject-verb-object entities along with respective attributes (e.g. colors, sizes locations, etc.). In some embodiments, the text analysis module 218 may identify descriptive text relating to a specific person, thing, or place what is included in the written work, which may be described in multiple places or throughout the written work. Thus, the descriptive text may be dispersed throughout more than one discrete portion of the written work.

The imagery selection module 220 may select images and/or image objects based on the descriptive words. In some embodiments, the imagery selection module 220 may select an image that closely (e.g., within a threshold) or best matches the descriptive text, such as by comparing metadata of the image object with the descriptive text. Here, the metadata of the images stored in the imagery datastore 230 may include text that describes the image.

In various embodiments, the imagery selection module 220 may select image objects, which may be components or pieces of an image to be assembled by compiling the selected image objects. As an example, each sub-tree of a parse tree may correspond to a component of an initial image. In order to generate initial images, there may be a large number of image terminals available in a datastore, such as the text-to-imagery datastore 232. Leaves of the parse tree may correspond to image objects such as people, places, and/or things and may have corresponding images in the imagery datastore 230. Classes of images may be available that are associated with verbs. For example, an image of a "boy" may include an image of a boy standing still, an image of a boy running, and so forth. A verb in the parse tree may connect left to right sub-trees. Adjectives may be used to determine values for the attributes of the image objects. For example, an image object of a "car" may include attributes about the type of car, the color, and so forth. In some embodiments, the imagery datastore 230 may include three-dimensional (3D) image objects, which may be manipulated (rotated, etc.) to customize and/or select a particular perspective (view) of a subject in the generated image (e.g., rotate car to view side, back, top, or isometric view). The imagery datastore 230 may include two-dimensional (2D) images that have a fixed perspective.

The image generation module 222 may assemble or otherwise compile various image objects to create an initial image for the descriptive text. For example, the image generation module 222 may stitch multiple image objects together to create an initial generated image for presentation to a user. The image generation module 222 may determine locations of the image objects with respect to one another, as well as sizes, depth details, and so forth. The image generation module 222 may also determine values for attributes of the image objects based on the descriptive text and/or other information, such default values, random values, and null values.

As an example, a subject model for images may accept <verb, object> entities. For example "a man wearing blue shirt." The object entity for man may include <wear, blue shirt>. A sample of an application program interface (API) is shown in below:

o=getObject("man")
o2=getObject("shirt",options=("color:blue", "texture: grid")) o.setVerb("wear",o2)

The objects may be eXtensible Markup Language (XML), or other similar types of objects, which may include attributors specified in code and naming structures.

The image editing module 224 may enable editing of the initial image generated by the image generation module 222. For example, the image editing module 224 may enable a user to specify values for attributes that are not specified in the descriptive text. For example, the descriptive text may indicate that a user is wearing blue jeans and a t-shirt, but does not specify the color of the t-shirt. The image editing module 224 may enable a user to modify the image by specifying that the t-shirt is green, for example. Illustrative inputs for the image editing module 224 are shown and described below with reference to FIG. 8. For example, the image editing module 224 may include drop down lists to specify values for attributes, such as colors, types, patterns, and so forth. The image editing module 224 may enable movement of image objects, changes in perspective (e.g., for 3D image objects), resizing, and other changes in location information. The image editing module 224 may enable specifying or changing other aspects of the initial image, such as backgrounds, moods, themes (e.g., crime scene, sci-fi, etc.), visual effects (e.g., painted canvas, line sketch, realistic rendering, etc.), and/or other visual features.

In some embodiments, the image editing module 224 may accept additional text input, which may be typed, spoken and converted to text, and/or input by other techniques. The text may be added to the descriptive text and used by the image generation module 222 to modify and/or add image objects, modify existing image objects, and/or make other changes to the initial image.

The output module 226 may finalize the generated image for an intended use. In some embodiments, the output module 226 may associate the descriptive text as metadata for the generated image. The output module 226 may insert the generated image into the written work in a specific location, such as at the beginning of a chapter, near the location of the descriptive text in the written work, and/or in other locations (e.g., for use as a cover or dust jacket). The output module 226 may create a trailer (e.g., slide show, story board, series of images, etc.) to supplement or complement the written work. The trailer may be created using additional imagery arranged with temporal relationships of the additional imagery, which may create a moving picture (i.e. a video), the slide show, or other series of images for view by a user. The output module 226 may generate promotional materials for the written work. In some embodiments, the output module 226 may create visuals that assist in selection and/or evaluation of the written work, such as when the written work is a manuscript.

The machine learning module 228 may update classifiers which manage the imagery datastore 230 and/or the text-to-imagery datastore 232. Thus, the machine learning module 228 may update and/or train one or more classifiers, which perform some or all of the functions described above. For example, the machine learning module 228 may update the text-to-imagery datastore 232 in response to edits to the initial image. Additional examples of operation of the machine learning module 228 are described below with reference to FIG. 10.

The computing architecture 202 may be implemented in a non-distributed computing environment or a distributed computing environment. For example, some of the modules described below may reside and/or be executed by the user device 204 while other modules may reside and/or be executed by the computing device 208 and/or the end-user device 212. For example, the text analysis module 218 may be performed on the user device 204 while the imagery selection module 220 may be performed at least partly by the computing device 208, which may determine "building blocks" as the object images, and send those object images to the user device 204 for assembly into an image via the image generation module 222. As another example, the image editing module may be useable by any of the user device 204, the computing device 208, and/or the end-user device 212 to enable editing of the image. In various embodiments, the modules of the computing architecture 202 may be stored in a distributed network, sometimes referred to as "cloud services", which may enable use by different devices that have network connectivity and permission to access and/or use the modules.

Figure 3:
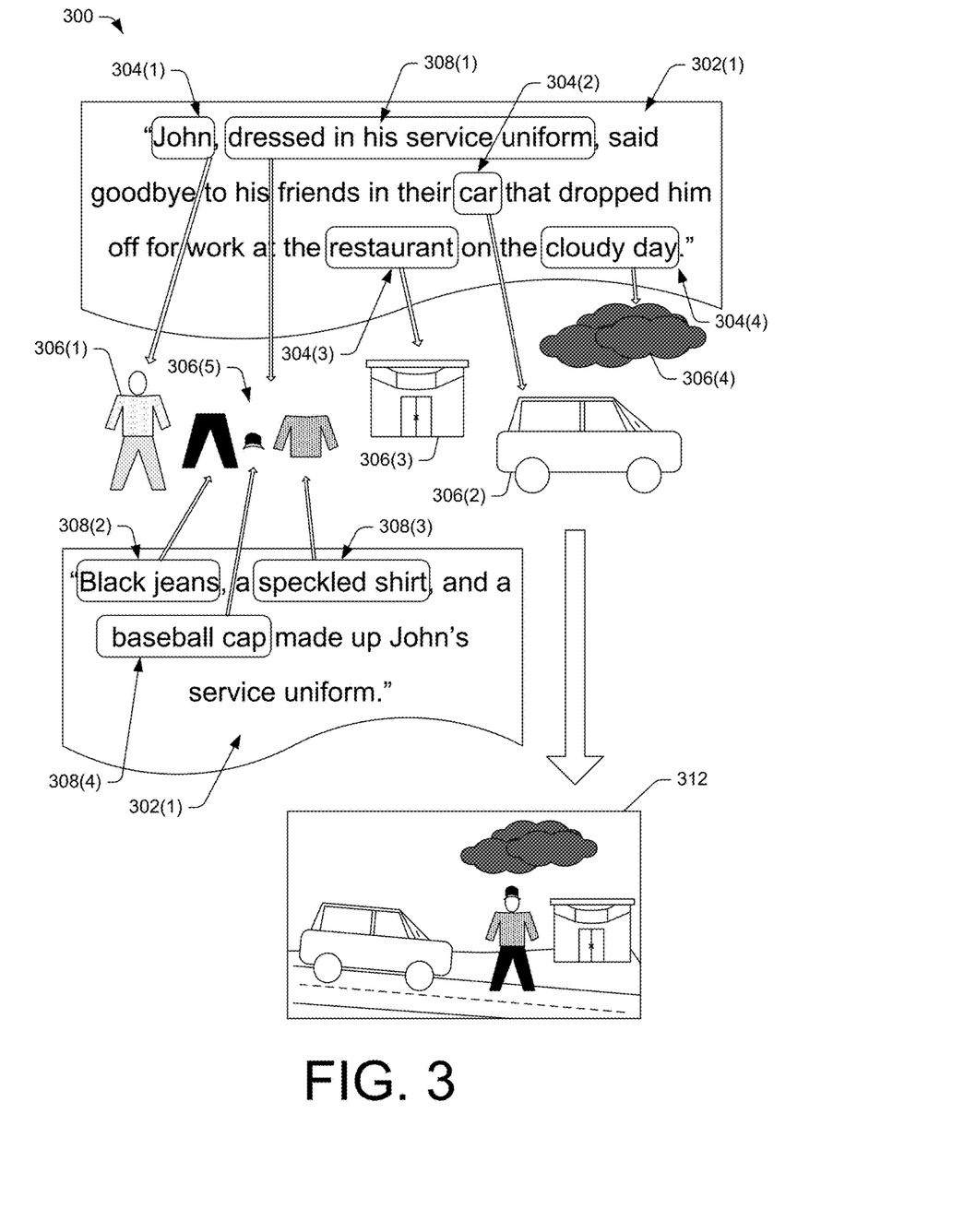
FIG. 3 is a schematic diagram showing illustrative generation of visual imagery from illustrative portions of a written work.

FIG. 3 is a schematic diagram showing illustrative generation of visual imagery from illustrative portions of a written work 300. The portions of the written work 300 may be determined by the text analysis module 218 as including the following example sentences. A first example sentence 302(1) may read: "John, dressed in his service uniform, said goodbye to his friends in their car that dropped him off for work at the restaurant on the cloudy day." A second example sentence 302(2) may read: "Black jeans, a speckled shirt, and a baseball cap made up John's service uniform." The first example sentence 302(1) and the second example sentence 302(2) may or may not be located in a same portion of a written work, and thus may be separated by no sentences, a few sentences, many pages of text, or one or more sections or chapters of text.

The text analysis module 218 may determine descriptive text 304 from within the example sentences 302. For example, a first descriptive text 304(1) may include a subject of a person, "John". For example, John may be a reoccurring character in the written work 300. A second descriptive text 304(2) may identify a subject of a thing, such as a car. A third descriptive text 304(3) may identify a subject of a place, such as a restaurant. A fourth descriptive text 304(4) may identify scene information, such as weather, time of day, and so forth. Different types of descriptive text 302 may be included in the portion, and thus may include a thing, a person, a place, or any combination of one or more thereof (e.g., two people at a place, one thing, a person holding a thing, etc.).

The imagery selection module 220 may match at least some of the descriptive text 304 to image objects 306 in the imagery datastore 230 using at least information in the text-to-imagery datastore 232. For example, the imagery selection module 220 may use a parse tree that includes leaves that represent each of the descriptive text 302(1)-(4). A first image object 306(1) may be an image object of a man selected by the imagery selection module 220 based on the first descriptive text 304(1) of "John." A second image object 306(2) may be an image object of a particular car selected by the imagery selection module 220 based on the second descriptive text 304(2) of "car." A third image object 306(3) may be an image object of a building selected by the imagery selection module 220 based on the third descriptive text 304(3) of "restaurant." A fourth image object 306(4) may be an image object of a weather selected by the imagery selection module 220 based on the fourth descriptive text 304(4) of "cloudy day."

To further add detail to the image objects, text attributes 308 may be used to populate image attributes 310, which are used to add visual details to the image objects 306. Examples of text attributes 308 may include a first text attribute 308(1) "dressed in his service uniform", which may describe an appearance of "John". Additional text attributes may be linked to a description of the service uniform (or John), and may include a second text attribute 308(2) of "black jeans," a third text attribute 308(3) of "speckled shirt," and a fourth text attribute 308(4) of "baseball cap." However, the attributes may be based on adjectives, while the things (or nouns) may be additional image objects. Thus, the attributes 308(1)-(4) may be used to determine image objects 304(5). In some embodiments, the selection of the first image object 304(1) of a man may result in association of the image objects 304(6), which each include one or more attributes, such as color, pattern, style, and so forth.

As discussed above, each of the image objects 306 may include attributes, which may be specified by data. For example, a man (image object) may include a shirt (sub-image object), which may have a color, pattern, and/or style (attributes). Some attributes may be specified by the text attributes 308 and given attribute values used to depict the image object, for example: <pants, blue> or <pants, jeans, blue>. Some attributes may not be given values based on the descriptive text, since the descriptive text may not include descriptions to populate all the attribute values. For example, the color of the car may not be specified in the descriptive text. In such instances, the attribute value for the color of the car may be selected by the image generation module 222. Values may be randomly selected, populated with default values, populated based on crowd sourced data, and/or populated in other ways.

The image generation module 222 may compile the image objects 306 into an initial image 312. To create the initial image 312, the image generation module 222 may extract details about location, position, orientation, perspective, and/or other details about the objects to determine how to arrange the image objects in the initial image 222. In some embodiments, the arrangement may be random, and may rely on movement of the image objects during an editing process performed by the image editing module 224. The image generation module 222 may determine other information and/or imagery for the initial image such as a background, mood, theme (e.g., crime scene, sci-fi, etc.), visual effect (e.g., painted canvas, line sketch, realistic rendering, etc.), and/or other visual features.

Figure 4:
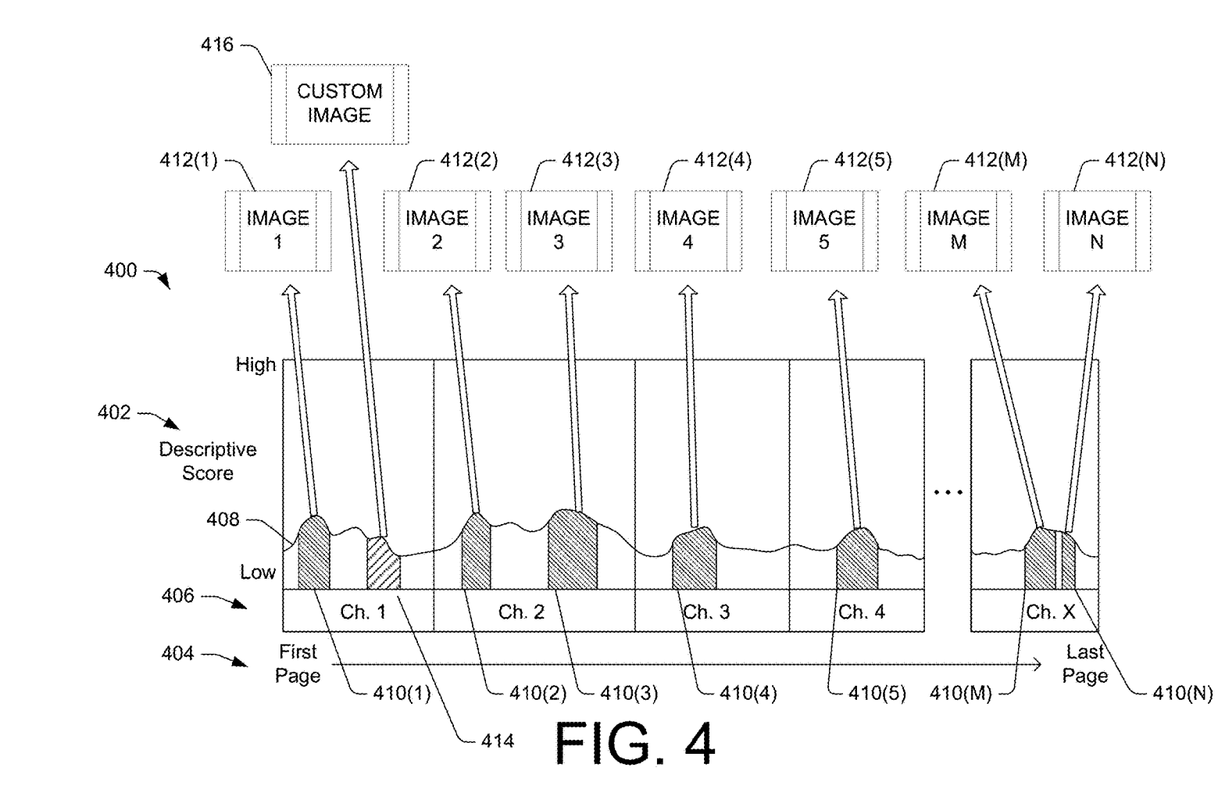
FIG. 4 is a schematic diagram showing illustrative metrics of a written work to identify dense portions of descriptive text and create imagery from those identified portions.

FIG. 4 is a schematic diagram showing illustrative metrics 400 of a written work to identify dense portions of descriptive text and create imagery from those identified portions. As shown in FIG. 4, a written book may be analyzed by the text analysis module 218 to create the metrics 400. The metrics 400 may be plotted in a graph that shows a relative descriptive score 402 in comparison to pages 404, chapters 406 (or sections), and/or other reference points (e.g., number of words, number of bytes, etc.). As discussed above, the text analysis module 218 may assign scores to words, sentences, paragraphs, and/or other portions of a written work, where the score represents a denseness of descriptive content that may be used to create imagery as discussed herein. A descriptive score plot 408 shows the resulting variation of scores across the written work.

The text analysis module 218 may select portions of text that are relatively high or dense in descriptive text based on the analysis of the written work (e.g., the scoring of the written work). Example descriptive text portions 410 may be selected due to their relative score compared to other sections in a chapter, in the written work, or in comparison with other metrics. For example, a descriptive text portion may be selected for each section of text (e.g., each chapter or division of text, each number of pages, etc.). The chapters may be located by determining a start location and an end location of each chapter of a written work based at least in part on headings, blank portions of pages, metadata, and/or other indicators. Thus, the text analysis module 218 may identify or select the descriptive text portions 410(1)-(N). These portions may then be used to create different images 412, such as corresponding images 412(1)-(M). In some embodiments, a descriptive text portion 410 may be used to create multiple images from the descriptive text, which may then be presented to a user for selection of a best match.

In various embodiments, a custom descriptive text portion 414 may be selected by a user, by crowd sourcing, and/or by other custom techniques. For example, when crowd sourcing is used, the custom descriptive text portion 414 may be an area that includes a lot of annotations or includes a high frequency of a popular term. The custom descriptive text portion 414 may be used to create a corresponding custom image 416 using the techniques discussed here. Thus, the custom descriptive text portion 414 may be selected in different ways, such as by selecting bounds of the portion (e.g., start and end page), key term frequency (e.g., density of a given term), and or other inputs or criteria.

The metrics 400 may enable a user to adjust or determine how many images to create for the written work, visually show the sources of text associated with images, and/or allow creation/deletion of images. In this way, the generation of imagery may be customized and visually depicted, such as by a user interface used by an editor, an author, a consumer, and/or other interested people.

FIGS. 5-7, 9, and 10 show illustrative processes that are illustrated as a collection of blocks in a logical flow graph, which represent a sequence of operations that can be implemented in hardware, software, or a combination thereof. In the context of software, the blocks represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described blocks can be combined in any order and/or in parallel to implement the processes. The processes are described with reference to the computing architecture 202.

Figure 5:
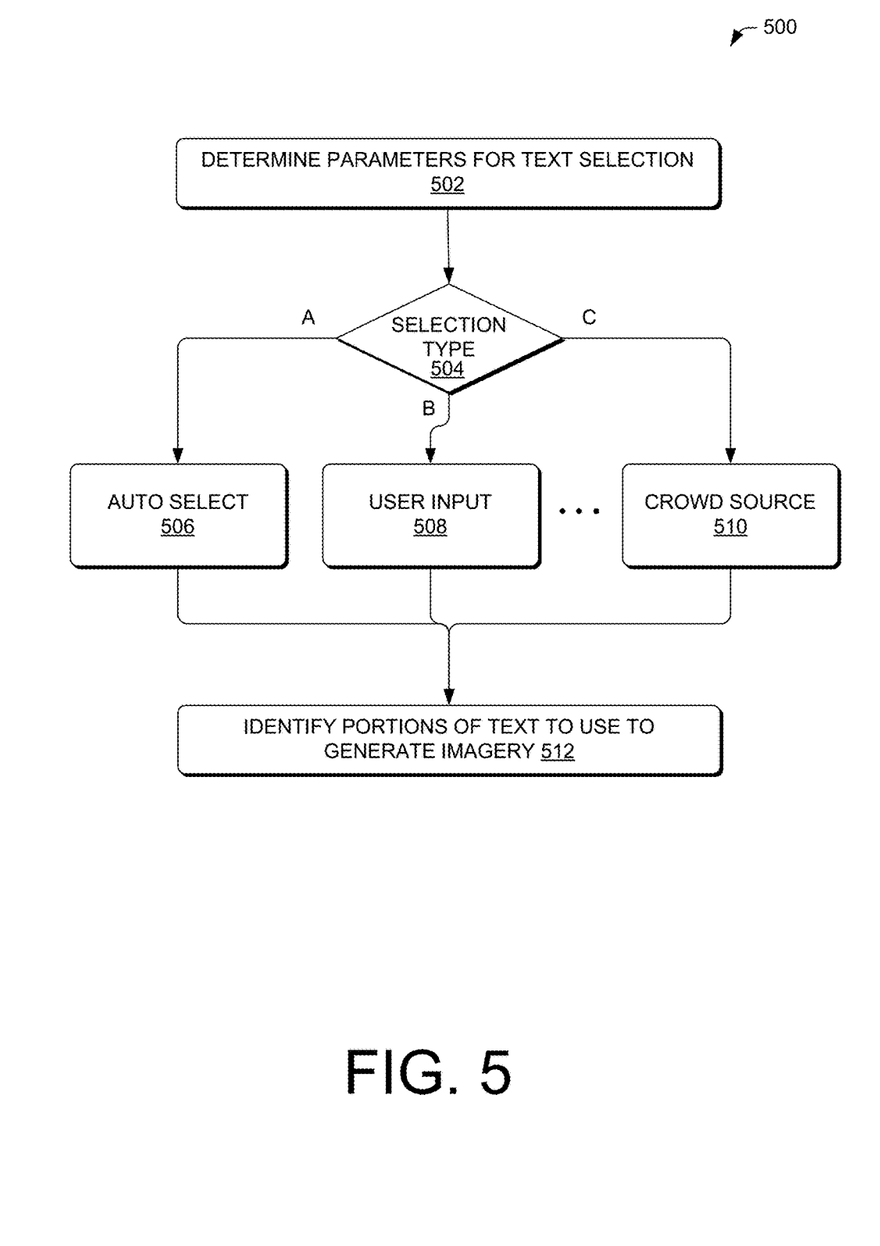
FIG. 5 is a flow diagram of an illustrative process to determine text used to create an image.

FIG. 5 is a flow diagram of an illustrative process 500 to determine text used to create an image. The process 500 may be performed at least in part by the text analysis module 218. In some embodiments, the text analysis module 218 may receive input from a user, such as a user selection, receive input from other users, such as through a crowd sourcing aggregator, and/or use other information to perform the process 500.

At 502, the text analysis module 218 may determine a parameters for text selection used to generate one or more images. The parameters may include inputs to determine bounds of portions of text, a location of the portion, words used to location the portion(s), and/or other inputs. In some embodiments, the text analysis module 218 may use default values as the parameters, which may require no or little user input.

At 504, the text analysis module 218 may determine a text selection type based at least in part on the parameters. The text selection type may include auto selection of text (following a route "A"), a user-based selection (following a route "B"), and/or a crowd sourced selection (following a route "C"). Each selection type is described in turn.

At 506, the text analysis module 218 may auto select portions of the written work based on default parameters. For example, the text analysis module 218 may use default parameters that result in selection of a predetermined number of images for a predetermined amount of text (e.g., a number of pages, a number of bytes of data, etc.) or grouping of text (e.g., a chapter, section, etc.). The auto selection may be performed with little or no user input. However, in some instances, user input may be collected to modify the parameters at the operation 502.

At 508, the text analysis module 218 may receive user input to determine a portion of text. For example, a user may select a portion of the plot 408 shown in FIG. 4 to select text to be used to create an image. The user may select text in other ways, such as by inputting the text to create an image (e.g., typing natural language descriptions in a text field, speaking terms, copying/pasting words, etc.). The user input may be received by the text analysis module 218 and processed to determine the text. In some instances, some of the parameters from the operation 402 may be used to determine the amount of text to be used. In various embodiments, the user may submit or enter a term, such as name of an object or character in the written work. The term may then be used to find descriptive text for the term. Thus, the text analysis module 218 may receive a term "fire dress" and return a description from the written work related to the "fire dress" as described in the written work.

At 510, the text analysis module 218 may access crowd sourced data and use the crowd sourced data to determine a portion of the text to use to generate an image. The crowd sourced data may include annotations, terms popular in social networks, text indicated as popular in other text sources, quoted text, and so forth. The text analysis module 218 may use the crowd sourced data to determine one or more portions of descriptive text in the written work.

At 512, following one or more of the operations 506, 508, and/or 510, the text analysis module 218 may identify portions of the written work to use to generate imagery. The use of the descriptive text is described next.

Figure 6:
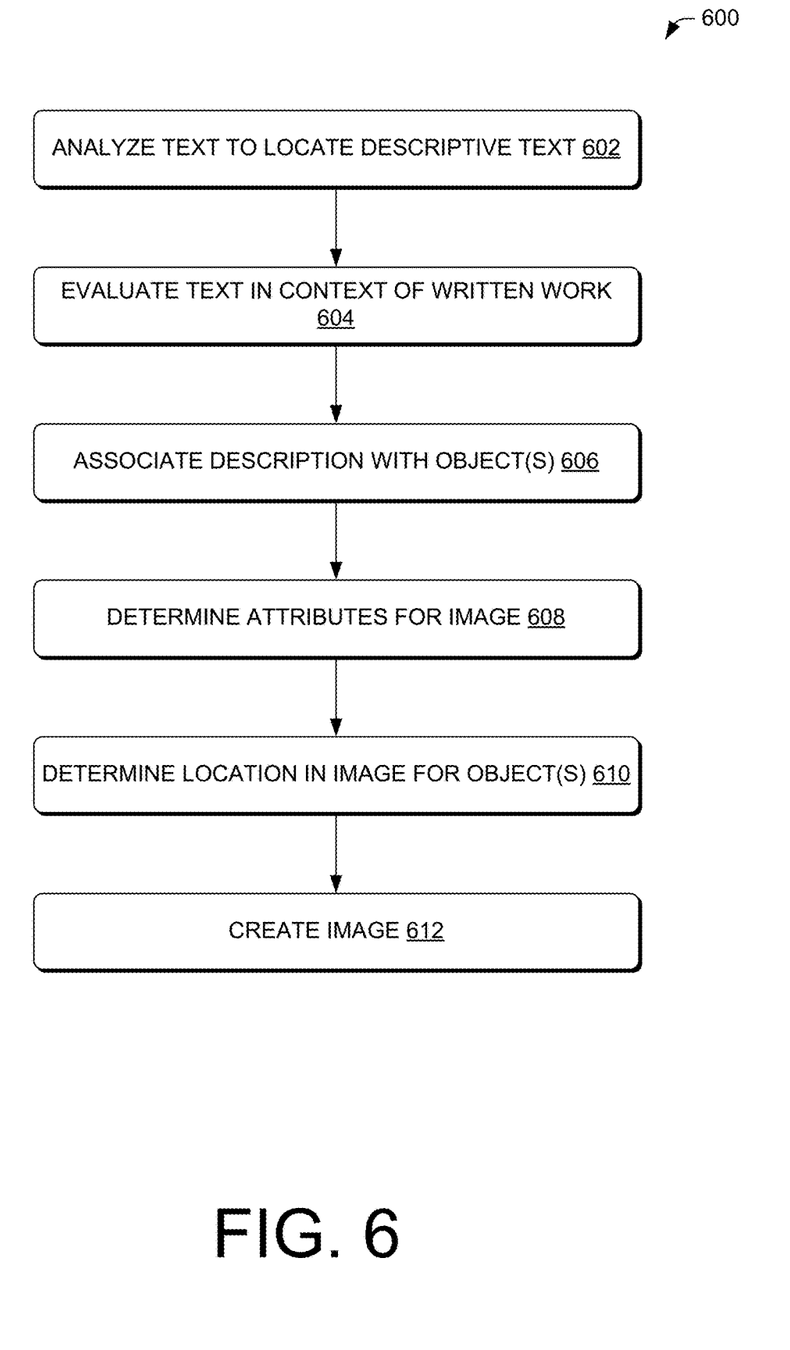
FIG. 6 is a flow diagram of an illustrative process to create an image representative of a portion of descriptive text.

FIG. 6 is a flow diagram of an illustrative process 600 to create an image representative of a portion of descriptive text. The process 600 may be performed by the text analysis module 218, the imagery selection module 220, and the image generation module 222.

At 602, the text analysis module 218 may analyze text portions to locate specific descriptive text. For example, the text analysis module 218 may identify specific descriptive text from the output of the operation 512 discussed above. The specific terms may be used to populate a parse tree listing out subjects, subjects and respective verbs, and/or subjects and respective attributes.

At 604, the text analysis module 218 may evaluate text in the context of the written work. For example, some terms may have multiple meanings which may not be clear unless interpreted in context with other terms. In some instances, the text may not be combined with other text from a different portion of the written work. For example, an attribute may conflict with an earlier description, and thus be disregarded. For example, a sentence may state "Sally changed spilled milk on her yellow shirt, and then changed into her red shirt." Here, Sally's shirt can be represented in an image as yellow or red, but not both.

At 606, the imagery selection module 220 may associate a description with an object (or subject). For example, the imagery selection module 220 may populate the parse tree listing out subjects, subjects and respective verbs, and/or subjects and respective attributes.

At 608, the imagery selection module 220 may determine attributes for an image to be generated. The attributes for the image may include a background, a mood, a theme (e.g., crime scene, sci-fi, etc.), visual effects (e.g., painted canvas, line sketch, realistic rendering, etc.), and/or other visual features.

At 610, the image generation module 222 may determine location information for the objects to be placed the image when multiple objects are used. The location may include determine foreground/background and depth locations, top/bottom/left/right locations, size, and other location aspects. The location information may be generated based on information in the descriptive text, default values, template data, and/or other available information. In some embodiments, the editing module 224 may be relied upon to properly determine the location for objects.

At 612, the image generation module 222 may create the initial image based at least in part on the objects from the operation 606, the attributes of the image from the operation 608, and the locations from the operation 610. In various embodiments, the initial image may be edited, as discussed below.

Figure 7:
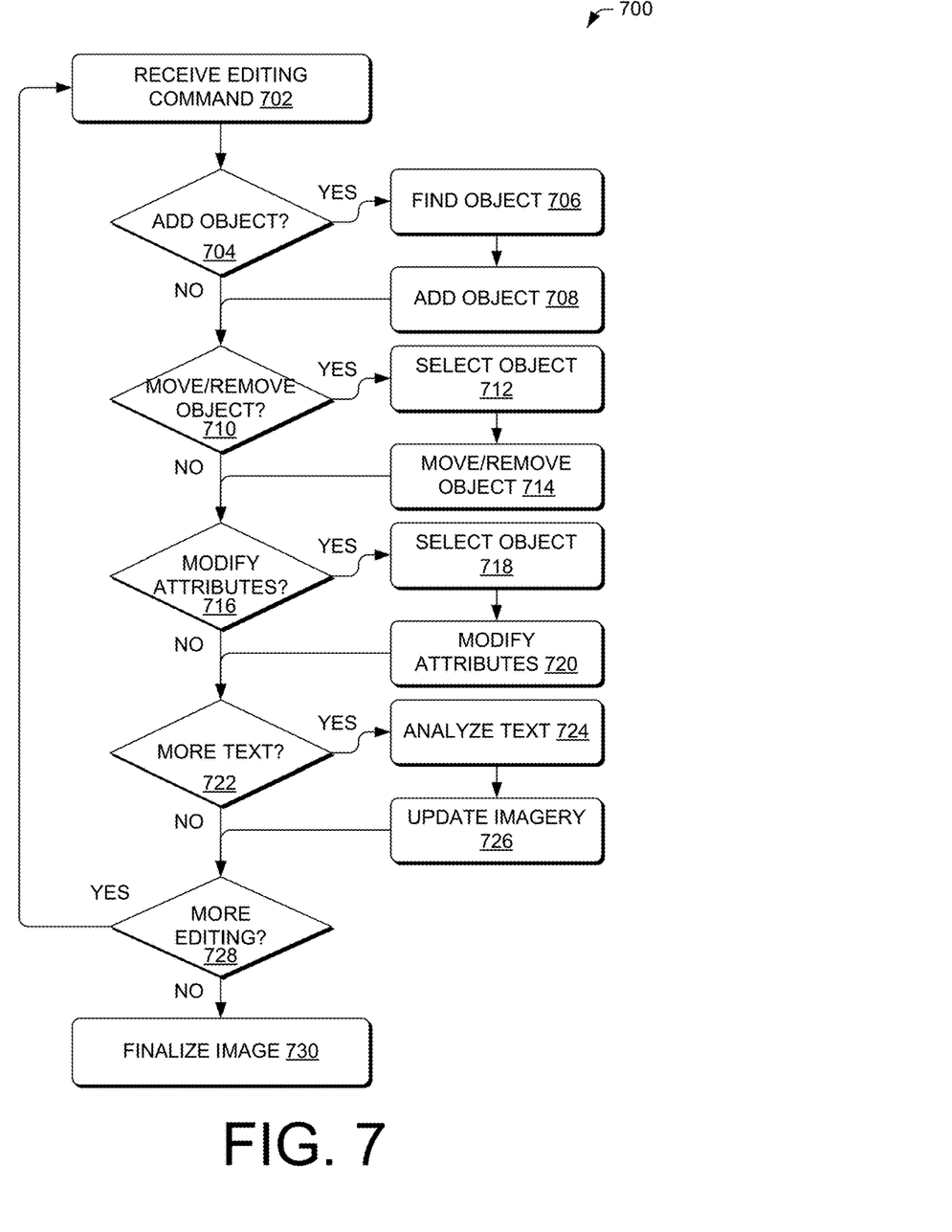
FIG. 7 is a flow diagram of an illustrative process to edit a created image prior to publication of the image.

FIG. 7 is a flow diagram of an illustrative process 700 to edit a created image prior to publication of the image. The process 700 may be performed by the image editing module 224 and may be used to modify the initial image created at the operation 612, discussed in the process 600.

At 702, the image editing module 224 may receive an editing command. The editing command may be input of text, selections, interaction with the image, keyed inputs, touch screen inputs, spoken inputs, and so forth. The inputs may be processed to perform editing operations. Example editing operations are discussed below.

At 704, the image editing module 224 may determine whether the editing command is to add a subject (following the "yes" route from the decision block 704). When the command is to add an image object, the image object may be located at 706 and added to the image at 708. For example, the image object may be retrieved from the imagery datastore 230 using a text search and/or a browse process. Following 708 or the operation 704 (via the "no" route), the process 700 may advance to a decision operation 710.

At 710, the image editing module 224 may determine whether the editing command is to move or remove a subject (following the "yes" route from the decision block 710). When the command is to move/remove an image object, the image object may selected at 712 and moved/removed at 714. For example, the image may be moved by dragging the object to another location in the image. Following 714 or the operation 710 (via the "no" route), the process 700 may advance to a decision operation 716.

At 716, the image editing module 224 may determine whether the editing command is to modify attributes of a subject (following the "yes" route from the decision block 716). When the command is to modify attributes of an image object, the image object may selected at 718 and attributes may be selected/modified at 720. For example, the user may input attributes to add to the descriptive text to provide attributes such as "blue shirt" or "running dog" to modify attributes. Following 720 or the operation 716 (via the "no" route), the process 700 may advance to a decision operation 722.

At 722, the image editing module 224 may determine whether the editing command is to add more text to the descriptive text (following the "yes" route from the decision block 722). When the command is to add more text, the text may be received at 724 and the image may be updated at 726 (such as by performing at least some of the operations described above with reference to the process 600). For example, the user may input additional text to add to the descriptive text to provide attributes such as "an apple tree" or "blue plaid shirt" to add or modify these objects. Following 726 or the operation 722 (via the "no" route), the process 700 may advance to a decision operation 728.

At 728, the image editing module 224 may determine whether to perform additional editing. When additional editing is to be performed (following the "yes" route from the decision block 728), the process 700 may return to the operation 702. When no additional editing is to be performed (following the "no" route from the decision block 728), the process 700 may advance to an operation 730 to finalize the image. Finalizing the image may include removing some details of the image, such as an ability to interact with layers, move object, and so forth. Finalizing the image may also associate metadata with the image, such as descriptive words used to create the image.

Figure 8:
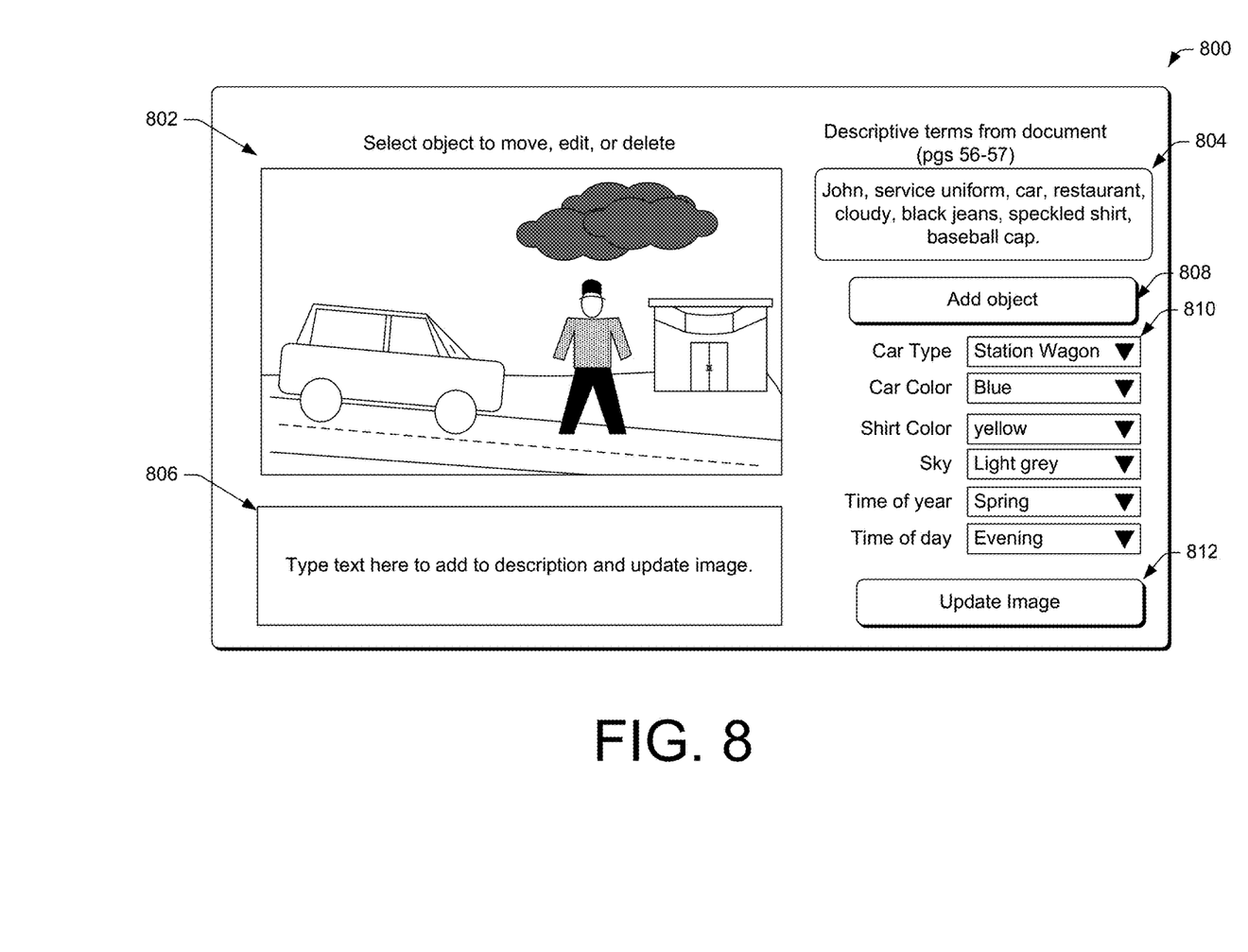
FIG. 8 is an illustrative user interface (UI) that includes a generated image and editing controls to enable a user to modify the image.

FIG. 8 is an illustrative user interface (UI) 800 that includes a generated image and editing controls to enable a user to modify the image. The UI 800 may be used to receive inputs to modify an initial image using the image editing module 224. The UI 800 may include a rendering of a created image 802, which may be updated to show changes based on the editing. The image 802 may allow selection to modify attributes of objects, move objects, and/or perform other editing operations. The image 802 may have a scene that includes image objects, backgrounds, environmental information (e.g., sun, rain, clouds, season, etc.), and/or other features besides people and things. The UI 800 may include a representation of metadata 804, which may include text used to generate the initial image. The UI 800 may enable addition of text in a text field 806. The text field 806 may be used by the operations 724 and 726 discussed above. A subject may be added using an add-object command 808. The command 808 may be used by the operations 706 and 708 discussed above. Attribute command 810 may enable updating and/or assigning attribute values, possibly to objects selected in the image 802. For example, selection of a subject in the image 802 may cause an update to the attribute commands 810 available in the UI 800. Thus, users can select objects on the image 802 to then modify a location of the selected object and/or modify attributes of the selected object. In some embodiments, additional commands may be available to modify the image 802, such as to modify visual effects, themes, and/or other details of the image in addition to attributes of objects. The UI 800 may include an update command 812 to cause implementation of commands/inputs received via the UI 800.

Figure 9:
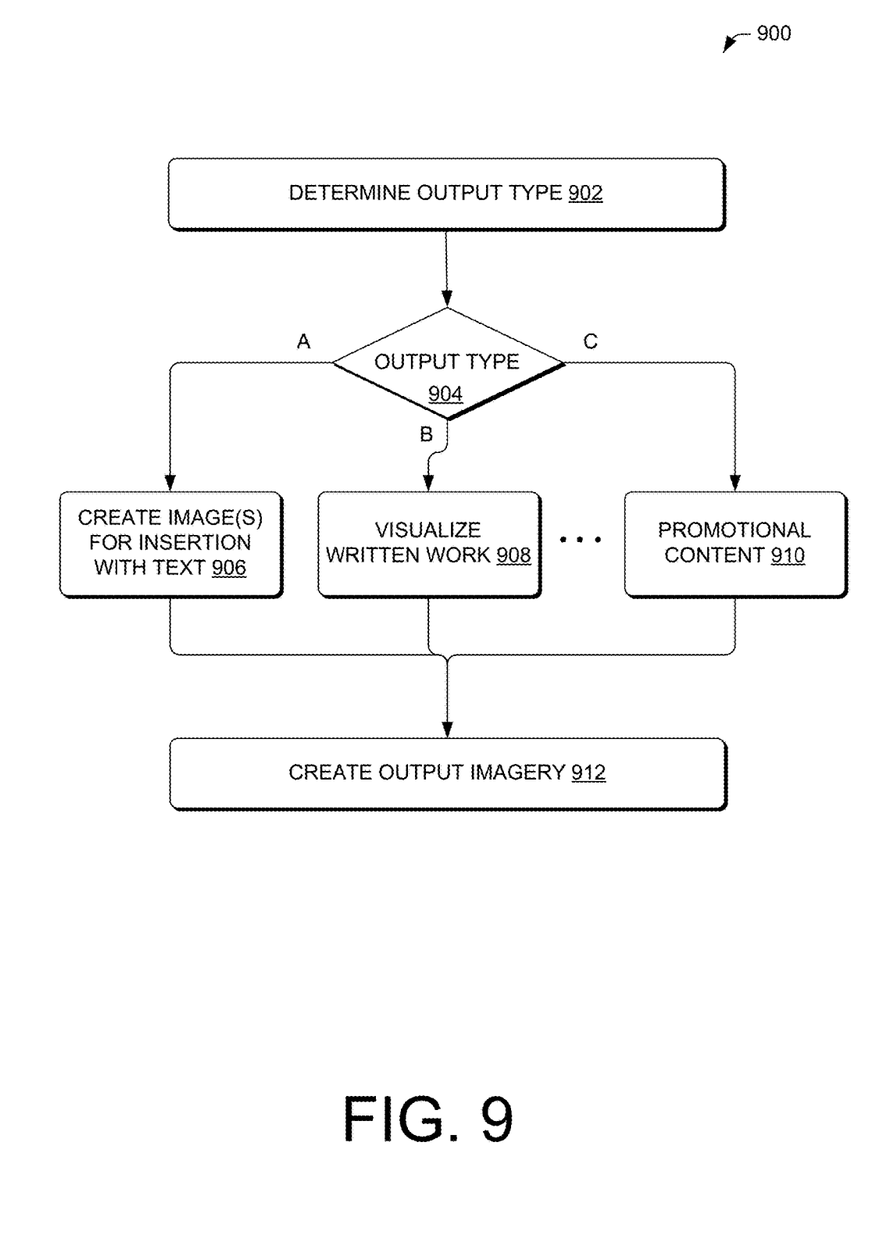
FIG. 9 is a flow diagram of an illustrative process to determine an output type of the created image(s).

FIG. 9 is a flow diagram of an illustrative process 900 to determine an output type of the created image(s). The process 900 may be performed at least in part by the output module 226.

At 902, the output module 226 may determine an output to generate using the imagery. In some embodiments, the output may be selected in response to received user input, in respond to a type of written content, and/or based on other factors.

At 904, the output module 226 may determine the output type based on the operation 902. The output type may include insertion of images with the written work (following a route "A"), visualizing the written work (following a route "B"), and/or a generating promotional content (following a route "C"). Each output type is described in turn.

At 906, the output module 226 may insert one or more generated images within the written work. For example, generated images may be inserted near the descriptive text, at the start of sections/chapters, and/or at other locations.

At 908, the output module 226 may generate a series of images to visually represent the written work. For example, the images may create a trailer to provide a preview for the written work. The images may supplement a manuscript to provide an editor/review some context about the written work.

At 910, the output module 226 may be promotional content. The promotional content may include imagery to market the written work, imagery for a just jacket if the written work is a physical book, a trailer for use to advertise the written work, and/or other marketing outputs.

At 912, following one or more of the operations 906, 908, and/or 910, the output module 226 may identify create the output imagery.

Figure 10:
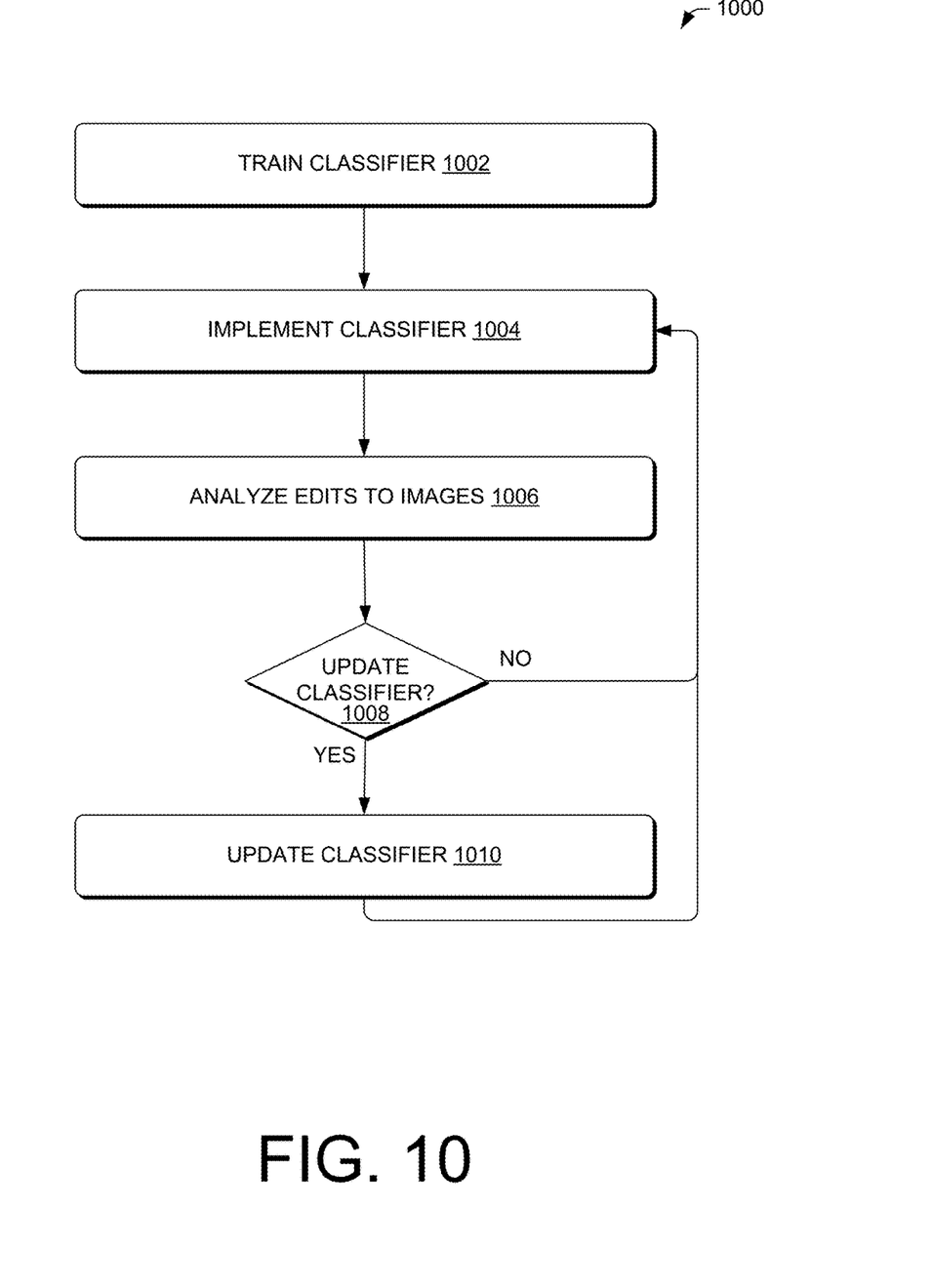
FIG. 10 is a flow diagram of an illustrative process to train, implement, and update a classifier used to select and/or generate images from descriptive text.

FIG. 10 is a flow diagram of an illustrative process 1000 to train, implement, and update a classifier used to create images from descriptive text. The process 1000 may be performed by the machine learning module 228.

At 1002, the machine learning module 228 may train a classifier used to create the text-to-imagery datastore and/or other relationships that are used to generate and/or select images based on text. For example, the machine learning module 228 may include training the classifier using images from existing written works that include images. In some embodiments, the training may include analyzing text from a written work that is near or adjacent to an image in the written work. The machine learning module 228 may be trained to create relationships between the text and the image, which may include human tagging of object in the image, computer vision, and/or other techniques. For example, attributes of the image may include objects in the image, placement of those object, and/or other attributes of the image (e.g., perspective, line type, shading, etc.). These attributes may be associated back to the text to create relationships in the classifier that may be used by the mashing learning module 228 to convert other text into an image.

As discussed below, the machine learning module 228 may be trained by updating the classifier based at least partly on user interaction with the classifier, which may update the relationships. For example, when the classifier creates an image and the user edits the image, the machine learning module 228 may modify the classifier to create relationships that, when implemented, more closely create the resulting edited image given the associated text (e.g., in a later conversion process). The machine learning module 228 may be trained to select object images based on text, infer geometric relative placement of object images in assembled imagery, modify attributes, and/or perform other operations discussed above.

At 1004, the machine learning module 228 may implement the classifier. Implementing the classifier may include making the text-to-imagery datastore 232 available for use and/or performing operations with the imagery selection module 220 and/or the image generation module 222, as discussed above. Thus, implementing the classifier may cause the classifier to create an image based on text from a document. The classifier may also enable a user to make edits to the image, which may be analyzed as discussed below. Example, edits include changing a location of objects, adding objects, removing objects, and/or other edits discussed above.

At 1006, the machine learning module 228 may analyze edits to the images by the image editing module 224. The machine learning module 228 may update metadata using the edits and/or add/remove associations in the classifier to change how text is associated with imagery in the text-to-imagery datastore 232.

At 1008, the machine learning module 228 may determine whether to update the classifier based on edits analyzed at the operation 1006. When the machine learning module 228 determines to update the classifier (following the "yes" route), then the process 1000 may advance to an operation 1010. Otherwise (following the "no" route), the process 1000 may advance to the operation 1004.

At 1010, the machine learning module 228 may update the classifier to update metadata using the edits and/or add/remove associations to change how text is associated with imagery in the text-to-imagery datastore 232.

CONCLUSION

Although the subject matter has been described in language specific to structural features and/or methodological acts, it is to be understood that the subject matter defined in the appended claims is not necessarily limited to the specific features or acts described. Rather, the specific features and acts are disclosed as illustrative forms of implementing the claims.

What is claimed is:

1. A method of creating an image based on textual content of an electronic book (eBook), the method comprising:
   receiving an indication that a portion of text from the eBook has been annotated a number of times that is equal to or above a threshold amount;
   selecting, based upon the indication that the portion of text from the eBook has been annotated the number of times that is equal to or above the threshold amount, the portion of text from the eBook;
   analyzing the portion of the text to isolate descriptive words within the portion of the text, the descriptive words including subjects, objects, and adjectives used in the portion of the text;
   creating a parse tree using the descriptive words, the creating the parse tree including:
      determining a subject that is a character described in the eBook; and
      determining an attribute of the subject, the attribute describing an appearance of the character;
   selecting an image object by associating metadata of the subject of the parse tree with metadata of the image object to select the image object as a character image object that visually represents the character described in the eBook;
   modifying the character image object based on the attribute of the parse tree, the modifying including changing a size or a color associated with the appearance of the character;
   generating the image by including the character image object within a scene, the scene including at least background imagery associated with the eBook;
   causing the image to be displayed to a user for review via a user device;
   receiving an editing command from the user via the user device to edit an appearance of the character image object within the image, the editing command being natural language input that includes one or more additional descriptive words;
   modifying the character image object within the image based on the additional descriptive words in the editing command; and
   generating a second version of the eBook, after modification of the character image object within the image based on the editing command, by inserting the image into the eBook at a specific location proximate to the location of the portion of text from which the image is generated.

2. The method as recited in claim 1, wherein the editing command is an instruction to modify a position of the character image object within the image; and
   wherein modifying the character image object within the image comprises:
      determining a new position for the character image object based on the editing command, the new position being different than an original position of the character image object in the image as determined by the generating the image; and
      moving the character image object to the new position in the image.

3. The method as recited in claim 1, further comprising determining a verb associated with the subject, and wherein the creating the parse tree includes the subject, the attribute, and the verb, and wherein the selecting the object image includes associating metadata of the verb with the metadata of the image object.

4. The method as recited in claim 1, further comprising generating a second image from a different portion of text from the eBook and inserting the second image into the second version of the eBook at a second specific location proximate to the location of the different portion of text from the eBook.

5. A system comprising:
   one or more processors; and
   memory to store computer-executable instructions that, when executed, cause the one or more processors to perform acts comprising:
      receiving an indication that a portion of text from an electronic book (eBook) has been annotated a number of times that is equal to or above a threshold amount;
      selecting, based upon the indication that the portion of text from the eBook has been annotated the number of times that is equal to or above the threshold amount, the portion of text;
      analyzing the portion of text to identify descriptive words including a subject of the portion of text;
      associating an attribute of the descriptive words with the subject;
      selecting an image object that visually represents the subject using a relationship that associates text with imagery;
      determining an attribute value associated with the image object to cause the image object to visually represent the attribute;
      generating an image containing the image object;
      causing display of the image to a user for review via a user device;

receiving an editing command from the user via the user device to edit an appearance of one or more objects within the image, the editing command being natural language input that includes one or more additional descriptive words;

modifying the appearance of the one or more objects within the image based on the additional descriptive words in the editing command; and generating a second version of the eBook, after modifying the appearance of the one or more objects within the image in response to receipt of the editing command, by inserting the image into the eBook at a specific location proximate to the location of the portion of text from which the image is generated.

6. The system as recited in claim 5, wherein the editing command is an instruction to modify a position of the one or more objects within the image.

7. The system as recited in claim 5, wherein the natural language input is text entered by the user after the user's review of the imagery.

8. The system as recited in claim 5, wherein the one or more processors further perform acts comprising:
determining a start location and an end location of each of a plurality of chapters of the eBook based on headings, blank portions of pages, or both; and
selecting the portion of text from a chapter of a plurality of chapters of the eBook.

9. The system as recited in claim 5, wherein selecting the portion of text is based on input received from crowd sourcing data.

10. The system as recited in claim 5, wherein the image object includes metadata, and wherein the relationship associates the text with the image object based on the metadata.

11. The system as recited in claim 5, wherein the one or more processors further perform acts comprising:
creating a plurality of additional images based on the descriptive text; and
creating a trailer associated with the text to visually represent the text, the trailer including the plurality of additional images arranged temporally.

12. The system as recited in claim 5, wherein the determining the attribute value includes determining a color associated with the descriptive words, and further comprising representing at least a portion of the image object with the color.

13. The system as recited in claim 5, wherein the image object is a three dimensional (3D) image object, and wherein the one or more processors further perform acts comprising:
receiving an additional editing command to edit a perspective of the image object within the image, and
determining the perspective of the image object by rotating the 3D image object.

14. The system as recited in claim 5, wherein the image object is a first-image object, and wherein the one or more processors further perform acts comprising:
determining a second-image object; and
compiling the first image object and the second image object into the image.

15. The system as recited in claim 14, wherein the one or more processors further perform acts comprising locating the first image object relative to the second image object within the image based on a portion of the descriptive text that provides location information.

16. A method comprising:
receiving, from an electronic book (eBook) reader device, an indication of interaction between a user of the eBook reader device and a portion of the eBook, the interaction indicating one or more of copying, quoting, or annotating the portion of the eBook;
selecting, based upon the indication of interaction, the portion of the eBook;
identifying a subject within descriptive words of the portion of the eBook;
associating an attribute from the descriptive words with the subject;
selecting an image object representative of the subject;
determining that the image object depicts the attribute that is associated with the subject;
associating metadata with the image object by selecting at least a portion of the descriptive words as the metadata;
associating the image object with the portion of the eBook;
generating an image containing the image object;
causing display of the image to a user for review via a user device;
receiving an editing command from the user via the user device to edit an appearance of one or more objects within the image, the editing command being natural language input that includes one or more additional descriptive words;
modifying the appearance of the one or more objects within the image based on the additional descriptive words in the editing command; and
generating a second version of the eBook, after modifying the appearance of the one or more objects within the image in response to receipt of the editing command, by inserting the image into the eBook at a specific location proximate to the location of the portion of the eBook with which the image object is associated.

17. The method as recited in claim 16, further comprising:
determining a different attribute of the subject; and
determining an appearance of the image object within the image based on the different attribute.

18. The method as recited in claim 16, further comprising adding an additional image object into the image based on additional descriptive text from the eBook.

19. The method as recited in claim 16, further comprising determining a verb associated with the subject, and wherein the selecting the image object includes selecting the image object representative of the subject performing an action of the verb.

20. The method as recited in claim 16, further comprising separately outputting the image as promotional content that visually describes the eBook.

* * * * *